Feb. 26, 1929.
B. W. JONES
1,703,487
SYSTEM OF MOTOR CONTROL
Original Filed Oct. 20, 1922   3 Sheets-Sheet 1
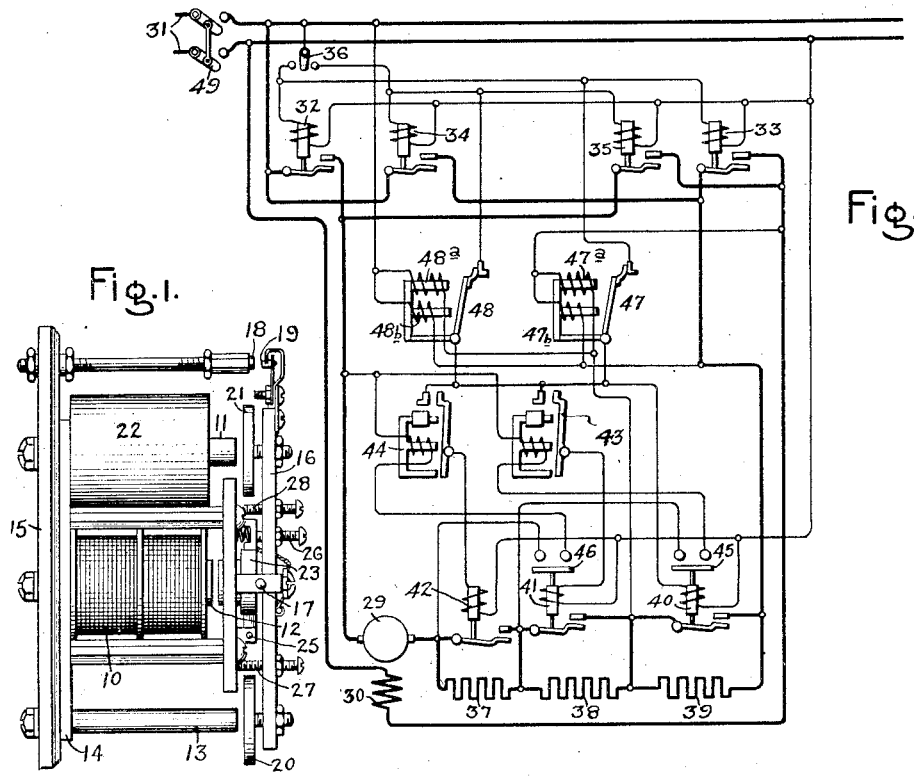
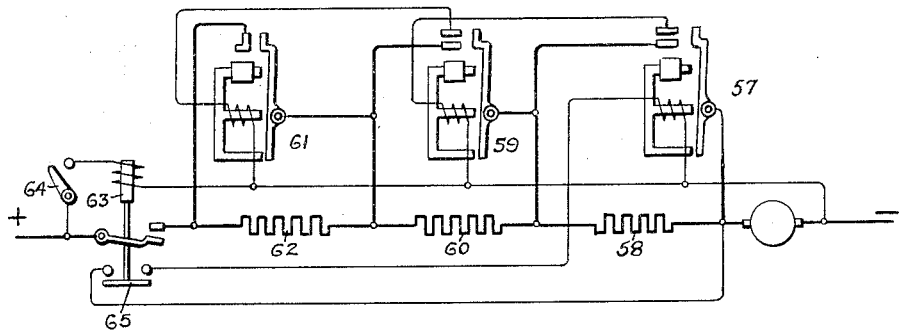
Inventor:
Benjamin W. Jones,
by *Alexander S. [Lunt]*
His Attorney.

Feb. 26, 1929.

B. W. JONES 1,703,487

SYSTEM OF MOTOR CONTROL

Original Filed Oct. 20, 1922     3 Sheets-Sheet 3

Inventor:
Benjamin W. Jones,
by
His Attorney

Patented Feb. 26, 1929.

1,703,487

UNITED STATES PATENT OFFICE.

BENJAMIN W. JONES, OF SCHENECTADY, NEW YORK, ASSIGNOR TO GENERAL ELECTRIC COMPANY, A CORPORATION OF NEW YORK.

SYSTEM OF MOTOR CONTROL.

Original application filed October 20, 1922, Serial No. 595,875. Divided and this application filed June 16, 1924. Serial No. 720,209. Renewed January 4, 1929.

This application is a division of my former application Serial No. 595,875, filed Oct. 20, 1922.

Motor control systems have heretofore been proposed in which the acceleration of the motor is under the control of switch mechanism controlled responsively to the rate of change of a motor operating condition, such as the rate of change of the current taken by the motor, or the rate of change of the motor counter-electromotive force, or the rate of change of the voltage drop across an accelerating resistor. Such systems have involved the use of a reactance, such for example as a transformer, the primary of which is connected in or to the motor circuit, and switch mechanism for controlling the motor is energized from the secondary of the transformer. One of the objects of the invention is to provide a control system operating on the rate-of-change principle in which a transformer or other form of reactance in the motor circuit is unnecessary.

A still further object of the invention is to provide a system of motor control in which electromagnetic switches for controlling the motor are provided which have inherent characteristics and are connected in such a manner that the switches operate in accordance with the rate of change of a motor operating condition.

These and other objects which will either be explained fully hereinafter or be obvious to those skilled in the art are attained by the systems and apparatus illustrated in the accompanying drawings.

Figure 3:
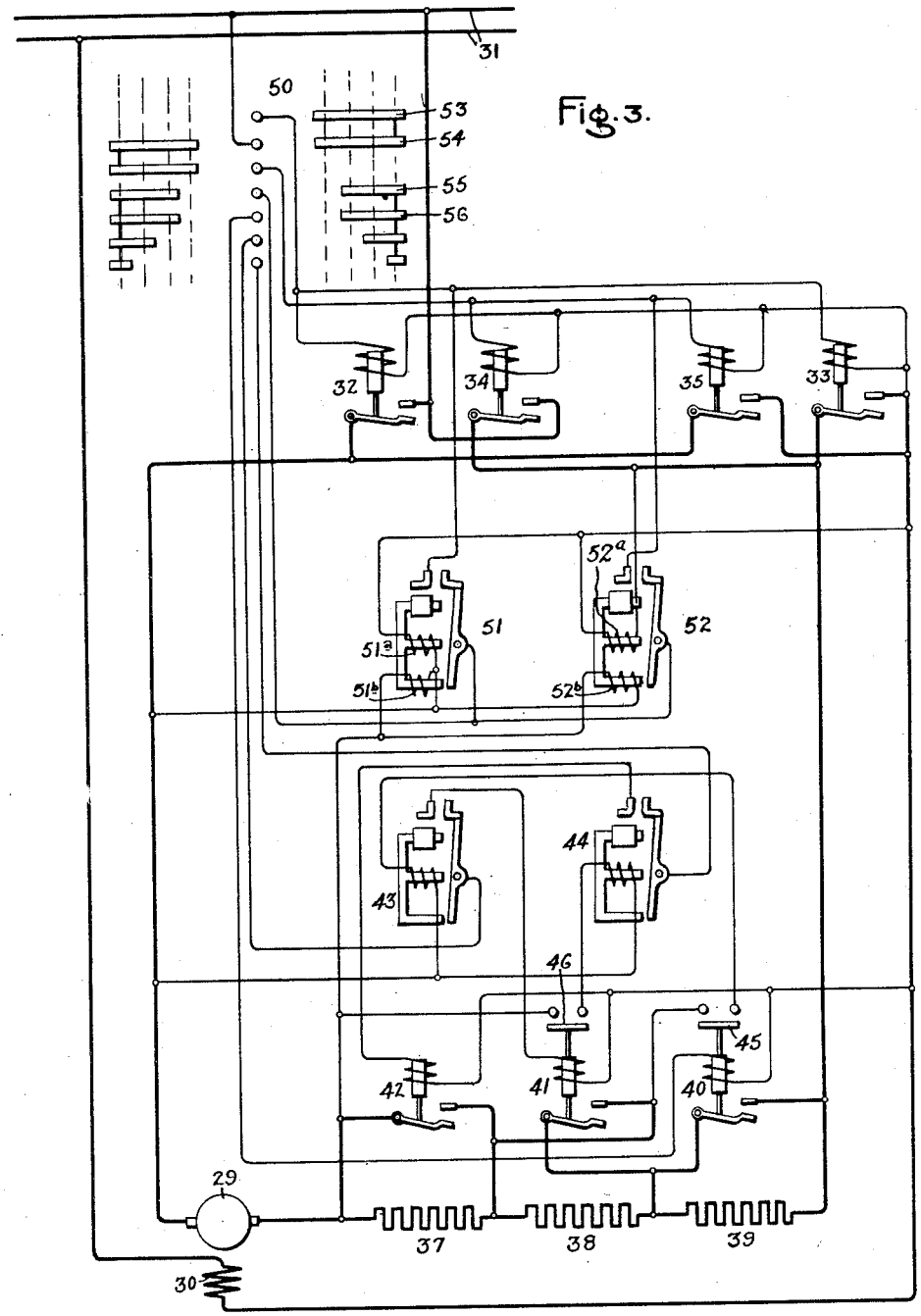
Figure 5:
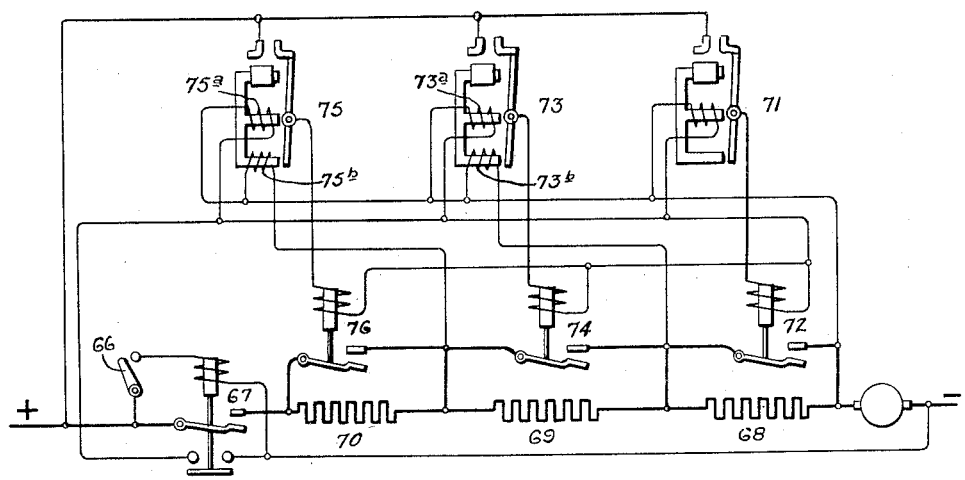
Figure 6:
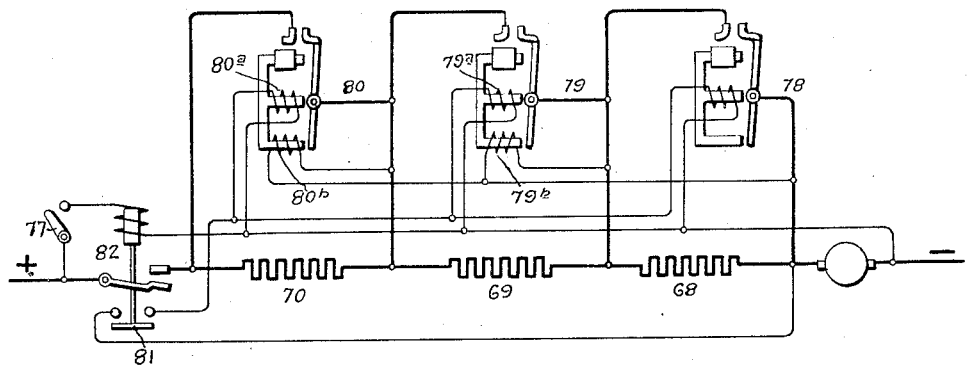

For a better understanding of the invention, reference is had to the accompanying drawings in which I have shown my invention embodied in concrete form for purposes of explaining the principles of the invention, and in which Fig. 1 is a side view of one form of an electroresponsive switch which may be advantageously employed in the systems of the invention; Fig. 2 is a very simplified diagram of a motor control system embodying the invention and in which electromagnetic relays operating in response to the rate of change of a motor operating condition are employed for the control of motor controlling switches; Fig. 3 is a somewhat similar but more elaborate motor control system employing rate of change relays for controlling the "plugging" as well as the acceleration of the motor in accordance with the invention; and Figs. 4, 5 and 6 are other very simplified motor control systems in accordance with the invention.

Referring to the drawings, the electromagnetic switch shown in Fig. 1 may be employed to advantage in the systems of the invention, and as shown, has an energizing winding 10 mounted on the middle of the three aligned legs 11, 12 and 13 of a magnet structure for the device. The legs or pole pieces 11, 12 and 13 of the magnetic circuit of the device are connected to each other by means of a plate 14 of magnetic material, and the various parts of the device are mounted upon a base 15 of insulating material. The armature 16 is pivotally mounted at 17 adjacent the middle leg 13 of the magnetic structure. This armature is acted upon by the flux set up by the magnet winding 10 so as to produce at least two magnetic forces, one of which predominates to hold the armature in the biased position shown in the drawing as long as the current in the energizing winding is changing at a substantial rate, and the other of which predominates when the current in the energizing winding becomes either substantially constant or when the rate of change of the current has diminished to a predetermined value to actuate the armature 16 and thereby close the circuit controlling contacts 18 and 19. The lower end of the armature 16 is provided with an adjustable armature 20 which cooperates with the pole 13, and the upper end of the armature 16 is provided with an adjustable armature 21 which cooperates with the pole 11. Mounted on the pole 11 is a non-magnetic electric conducting sleeve 22 which plays a very important part in the functioning of the switch. When the current through the energizing winding 10 varies, the sleeve 22 acts as a short circuited conductor to set up a magnetic flux in opposition to the magnetic flux set up by the winding 10 in the pole 11. This has the effect of forcing the magnetic flux set up by the winding 10 through the pole 13 and thereby causing the magnetic attraction on the armature 16 to be principally on the lower side of the pivot point 17 while the energizing current of the winding varies at a substantial rate. This will cause the armature 16 to be held in its biased position until the current through the energizing winding becomes substantially constant, whereupon the effect of the flux retarding device 22 becomes negligible and the magnetic force which tends to close the switch contacts 18 and 19 will predominate over the magnetic force of the flux through the pole 13. It will be observed that as long as the energizing current of the magnet winding is varied, the short circuited conductor 22 will retard the building up of the flux in the pole 11, but that as soon as the current in the magnet winding becomes substantially constant, or the rate of change of the current has diminished to a predetermined value, the short circuited conductor 22 will have practically no effect on the distribution of the flux. The flux set up by the magnet winding will divide between the paths 11 and 13 in accordance with the reluctance of the paths. The pole piece 20 may be adjusted with respect to the end of the pole 13 so that the air gap will be slightly larger than the air gap between the pole piece 21 and the end of the pole 11. This is to insure that the switch will be positively held in the open position until it is desired that the switch shall close. The device is preferably designed so as to have an inherent time function which corresponds to the rate of change of the energizing current.

Although an electroresponsive switch as constructed and arranged in Fig. 1 is entirely operative without any special provision for positively biasing the armature 16 so that it will be held in its biased position until the current through the magnet winding becomes substantially constant, and I have shown the switch diagrammatically in the systems of the invention without such special provision; nevertheless in the arrangement of Fig. 1, I have provided an auxiliary armature 23 which is biased away from the end of the pole 12 by means of a spring 24. This auxiliary armature is pivotally mounted at 25 and its upper end cooperates with an adjustable stop 26 carried by the armature 16, so that as long as the magnet winding is not energized, the armature 16 will be positively biased to the position shown in the drawing. As soon as the magnet winding is energized, the armature 23 is attracted to release the biasing effect of the spring 24, so that the armature 16 may be moved to its second position when the current through the winding 10 becomes substantially constant, or the rate of change of the current has diminished to a predetermined value. When the magnet winding is deenergized the auxiliary armature operates to restore the armature 16 to the position shown in Figure 1. The stop 27 is provided for limiting the movement of the armature 16 toward the magnet pole 13, and the stop 28, also carried by the armature 16, is provided for limiting the closing movement of the armature 16. The arrangement is preferably such that after the auxiliary armature is operated to release the armature 16, the armature 16 is in balance except for the effect of the magnetic forces on the same. This switch is broadly and specifically claimed in my said original application, Serial No. 595,875 filed Oct. 20, 1922, of which the present application is a division. When an electric motor is connected to the supply circuit, there is a comparatively heavy rush of current which rises in value from a zero value to a maximum in a certain short interval of time, and then drops from the maximum value to a substantially constant value in a longer interval of time. The time taken for the current to pass from the peak value to the substantially constant value is determined by the length of time required for the counter-electromotive force of the motor to build up to a substantially constant value. The motor current also varies in a similar manner when a resistor switch is closed to accelerate the motor. There is thus a changing condition of the motor, either the changing of the motor current or the changing of the counter electromotive force, which may be used as the controlling influence in effecting the starting or other regulation of the motor. A system of control which takes advantage of the rate of change of a motor operating condition as the controlling influence in regulating the motor and which is independent of the instantaneous value of either the motor current, the counter electromotive force of the motor, or the selected condition of the motor, is inherently correct for certain applications of motor control. For example, in the control of a steel mill auxiliary motor, where the load on the motor varies materially from time to time and it is desired in all events that, within the capabilities of the motor, the motor shall start regardless of the load, the system of the present invention has a particular application. It has heretofore been common practice to control the starting of a motor in accordance with the current taken by the motor. Such an arrangement leaves something to be desired because of the fact that if the current limit setting is such that it will take care of the extreme conditions, the setting of the current limit device will be too high for the ordinary conditions encountered, and the motor controlled may thereby be injured by being required to accelerate at all times in accordance with a condition which may happen very seldom. In case the acceleration of the motor is in accordance with the operation of a time limit device and the time limit device is set to take care of the extreme condition, the acceleration of the motor will take entirely too long for the ordinary conditions encountered, and in case the time limit device is set for the ordinary conditions encountered, the acceleration will be at too rapid a rate for the proper protection of the motor under the extreme conditions. Combined current limit and time limit automatic starting arrangements have heretofore been proposed, but these have all involved undesirable complications from an operative standpoint and have left something to be desired in the way of simplicity and reliability of operation. My present invention makes use of the rate of change of a condition of the motor or the motor circuits as the proper controlling function for starting and regulating the speed of the controlled motor.

In Fig. 2 I have shown in very simplified diagram a reversing motor control system in which the electro-responsive switch of Fig. 1, takes the form of electromagnetic relays for the control of starting resistor contactors for an electric motor. As will be explained fully hereinafter, my invention is not necessarily limited to applications employing relays for the control of contactors, since the electro-responsive switches of the invention may also be used as the resistor contactors. Referring to Fig. 2 the electric motor 29 having a series field 30 is adapted to be connected to the supply circuit 31 by means of the line contactors 32 and 33 for forward operation and by means of the line contactors 34 and 35 for reverse operation. The reversing pilot or master switch 36 controls the energization of the aforesaid line contactors. The motor starting resistors 37, 38 and 39 are connected in the motor armature circuit so as to regulate the motor at starting. The resistor contactor 40 is provided for short circuiting the resistor 39, the contactor 41 for short circuiting the resistor 38, and the contactor 42 for short circuiting the resistor 37. The relay 43 is provided for controlling the energization of the contactor 41 and the relay 44 is provided for controlling the energization of the contactor 42. These relays are preferably of the type shown in Fig. 1 and the relay is shown in very diagrammatic form merely to indicate in a control system the nature of the relay intended to be used. The energizing winding of the relay 43 is controlled by an auxiliary switch 45 on the resistor contactor 40, and the energizing winding of the relay 44 is controlled by an auxiliary switch 46 of the resistor contactor 41. The connections are such that after the resistor contactor 40 is closed, the relay 43 is connected across the motor armature and the resistor 37, so that the relay is energized in accordance with the counterelectromotive force of the motor which varies in the manner heretofore explained. The connections are also such that when the resistor contactor 41 is closed by the operation of the relay 43, the winding of the relay 44 is connected across the motor armature so as to be energized in accordance with the counterelectromotive force of the motor. For certain applications, I find it advisable to employ voltage drop control relays for controlling the "plugging" or stopping of the motor upon reversal in a manner described and broadly claimed in an application for patent by myself and Eugene R. Carichoff, Serial No. 527,520, filed January 6, 1922, a renewal of an application Serial No. 354,030, filed January 26, 1920. The particular construction of the relay is as disclosed and claimed in Patent No. 1,500,800 issued to Eugene R. Carichoff and myself on July 8, 1924. The resistor contactor 40 is controlled by the voltage drop relays 47 and 48. The relay 47 is connected so as to be operative to control the resistor contactor 40 for forward operation; that is, when the line contactors 32 and 33 are closed, and the relay 48 is provided for controlling the resistor contactor 40 for reverse operation, that is, when the line contactors 34 and 35 are closed. The operation of my invention as thus constructed and arranged and with the parts in their respective positions shown in the drawing, is as follows:—

The disconnecting switch 49 will first be closed. The windings of the voltage drop relays 47 and 48 will then be connected in series relation across the supply circuit 31:—thus, the upper windings $48^a$ will be connected in series with the upper winding $47^a$, and the winding $48^b$ on the middle leg of the magnetic structure of the relay 48 will be connected in series with the winding $47^b$ on the middle leg of the magnetic structure of the relay 47. The relays 47 and 48 will thus be energized to open their circuit controlling contacts. Assume that it is desired to operate the motor in the forward direction. The pilot switch 36 will be thrown to its left hand position, thereby energizing the line contactors 32 and 33 to close and establishing a circuit for the motor which includes the contacts of line contactor 32, motor armature, resistors 37, 38 and 39, line contactor 33, series field 30, to the other conductor of the supply circuit. It will be noticed that when the line contactor 33 closes, the winding $47^b$ of the relay 47 will be short circuited, so that the control of the closing of the relay 47 will be given to the winding $47^a$, and it will also be noticed that the winding $47^a$ is now connected across the resistor 39. It will also be noticed that the closing of the line contactor 33 connects the winding $48^b$ of the relay 48 directly across the supply circuit (through the series field 30), and the winding $48^a$ is connected across the motor armature and the starting resistors 37 and 38, so that the relay 48 will be energized to remain open. The resistor 39 which is used principally to protect the motor during "plugging" will be of a comparatively high value of resistance and the setting of the relays 47 and 48 will be such that the contactor 40 will be positively operated to close for all loads which would be expected to be encountered by the motor 29 in starting. The resistor 39 has an important function in starting in limiting the torque of the motor to a comparatively low value so that shocks to the machine driven thereby are prevented. When the back-lash between gearing has been taken up and the static friction of the parts has been broken, the torque of the motor may be materially increased so as to take up the load gradually. In this manner the motor is positively started unless a dangerous condition is present, but the initial torque of the motor is reduced to the proper value. After an interval the winding 47$^a$ of the relay 47 will permit the switch member of the relay to return to its closed or biased position, so as to thereby energize the resistor contactor 40 to close. The relay 48 will be maintained open in the manner previously explained. When the resistor contactor 40 closes, the winding of the rate of change relay 43 will be connected across the motor armature and the resistor 37. The counterelectromotive force of the motor will gradually increase as the motor accelerates. As long as the counterelectromotive force of the motor is changing, the relay 43 will operate to hold its armature in the open position of the switch contacts controlled thereby, in the manner explained in connection with the electromagnetic device of Figs. 1, 2 and 3. When the counterelectromotive force of the motor becomes substantially constant and thus the current supplied to the energizing winding of the relay 43 becomes substantially constant, or when the rate of change of the energizing current diminishes to a predetermined value, the relay will close in the manner explained in connection with Fig. 1 so as to energize the resistor contactor 41 to close. The resistor contactor 41 will short circuit the starting resistor 38 and also energize the winding of the rate of change relay 44, the winding of the relay 44 being connected across the motor armature so as to be energized in accordance with the counter-electromotive force of the motor. The short circuiting of the starting resistor 38 will cause the motor to increase in speed and build up a higher counter-electromotive force. The counter-electromotive force will rise in value gradually until a substantially constant value is reached, at which the relay 44 will close its contacts and energize the resistor contactor 42 to close and short circuit the starting resistor 37, thus connecting the motor directly to the supply circuit. If it is now desired to reverse the motor, the pilot or master switch 36 will be thrown from its left hand position to its right hand position, thereby deenergizing the line contactors 32 and 33 and energizing the line contactors 34 and 35 to close. It will be remembered that the relay 48 was maintained energized so that the contacts controlled thereby were maintained in the open position. As soon as the master switch 36 is moved from its left hand position to its neutral or off position, the windings of the voltage drop relays 47 and 48 will again be connected in series relation across the supply circuit so that the relay 47 will be again open. It will be noticed that when the line contactor 34 closes, it short circuits the winding 48$^b$ of relay 48, and that the winding 48$^a$ is connected across the resistor 39, so that the closing of the relay 48 will be under the control of the winding 48$^a$. The winding 47$^a$ of the relay 47 will be connected across the motor armature and the resistors 37 and 38, and the winding 47$^b$ will be connected across the supply circuit, so that this relay 47 will be maintained open in the same manner that the relay 48 was maintained open when the motor was being operated in the forward direction. The resistor 39 provides a protection for the motor when the motor is "plugged", so that the motor may be reversed from full speed operation in one direction to operation in the other direction. The current through the motor armature will reverse in direction, and when the current taken by the motor during the interval of plugging is reduced to such a value that the winding 48$^a$ will permit the switch member of the relay 48 to return to its closed position, the resistor contactor 40 will be closed. The acceleration of the motor is then placed under the control of the rate-of-change relays 43 and 44 in the manner previously explained in connection with the forward operation of the motor.

The invention is not limited to an arrangement in which the control of the "plugging" of the motor is governed by "voltage drop" switch mechanism, nor is the invention limited to an arrangement in which the step-by-step progression of the resistor accelerating switches automatically proceeds when the master switch is thrown to a definite position. Thus, for instance, the control of the plugging of the motor may be governed by switch mechanism which is energized in accordance with the rate of change of some motor operating condition. Furthermore, the arrangement may be such that the automatic acceleration of the motor may be arrested at any desired speed control point, and the step-by-step automatic progression of the motor accelerating switches may be at all times under the control of the operator. The arrangement shown in very simplified diagram in Fig. 3 illustrates a system of motor control embodying the above mentioned departures from the arrangement as shown in Fig. 2.

In the arrangement of Fig. 3 a master switch 50 having a plurality of operative positions for both forward and motor reverse operation is provided for controlling electro-responsive switch mechanism to control the direction and the speed of motor operation. The line contactors 32 and 33 are provided for forward motor operation and the line contactors 34 and 35 are provided for reverse motor operation, as in the arrangement of Fig. 2. Resistors 37, 38 and 39 are provided for limiting the current in the armature circuit of the electric motor 29. As in the arrangement of Fig. 2, the resistor 39, which may be termed the "plugging" resistor, is of a comparatively high resistance value, so that the motor may be quickly reversed from operation in one direction to operation in the other direction without any damaging effects to the motor. The contactor 40 is provided for short circuiting the "plugging" resistor 39, the contactor 41 is provided for short circuiting the resistor 38, and the contactor 42 is provided for short circuiting the resistor 37, as in the arrangement of Fig. 2. The contactor 40 is under the control of the master switch 50 and the "plugging" relays 51 and 52, which in general accomplish somewhat the same functions as the plugging relays 48 and 47 respectively, of the arrangement of Fig. 2. These relays 51 and 52 may be of the type shown in Fig. 1, and they are provided with auxiliary windings disposed on the lower of the three aligned legs of the relays, the connections being such that the lower windings are energized in accordance with the counter-electro-motive force of the motor. The "rate-of-change" relay 43 is provided for controlling the resistor contactor 41 and the rate-of-change relay 44 is provided for controlling the resistor contactor 42. The connections are such that the windings of these relays are energized in accordance with the counter-electromotive force of the motor. As thus constructed and arranged, the operation of my invention is as follows:

Assume that it is desired to operate the motor in the forward direction at a reduced speed. The master controller 50 will be thrown to the left to its first operative position, thereby energizing the line contactors 32 and 33. The motor is thereby connected to the source of supply 31 for forward operation, the motor circuit being through the line contactor 32, motor armature resistors 37, 38 and 39, line contactor 33, series field 30 to the other conductor of the supply circuit 31. The winding $51^a$ of the rate-of-change "plugging" relay 51 is energized across the supply circuit and the winding $51^b$ is connected across the motor armature. The winding $52^a$ of the relay 52 is short circuited by the contacts of the line contactor 33 and the winding $52^b$ of this relay is connected across the motor armature. The flux set up by the coil $51^a$ will so divide that the major part thereof will initially pass through the lower leg of the relay because of the short-circuited winding on the upper leg of the relay. The air gap between the armature of the relay and the lower leg of the relay magnetic structure is adjusted so that the major portion of this flux of the winding $51^a$ will pass through the lower and middle legs of the relay magnetic structure. The relay will therefore remain temporarily in its open position. The voltage applied to the winding $51^b$ will gradually increase due to the speeding up of the motor and the flux set up by this winding in the relay magnetic structure will be in the same direction as the flux set up by the winding $51^a$ so that the two fluxes will combine in the upper leg of the relay. The relay will thus close when the speed of the motor has increased to the desired value.

If the master switch 50 is now thrown to the left to its second operative position, the winding of the resistor contactor 40 will be energized through a circuit which includes the segments 53 and 54 of the master switch, contacts of the relay 51, segments 55 and 56 of the master switch, so that the contactor 40 will be energized to close and thereby short circuit the resistor 39. The auxiliary switch 45 of the resistor contactor 40, in closing, will connect the winding of the rate-of-change relay 43 across the motor armature and the resistor 37, so that the relay 43 will be energized in accordance with the counter-electromotive force of the motor. The counter-electromotive force of the motor will gradually rise due to the speeding up of the motor until a substantially constant value is reached at which the relay 43 will close its contacts. It is not necessary that the closing of the relay be delayed until after the current has become a constant value, since it is sometimes sufficient that the relay remain open until after the rate of change of the current has diminished to a predetermined value. However, the resistor contactor 41 will not be energized to close until after the master switch 50 has been moved to the left to its third operative position. When the contactor 41 closes, the winding of the relay 44 is connected across the motor armature through the auxiliary switch 46, and this relay will function to prevent the closing of the contactor 42 until the counter-electromotive force of the motor has again risen to a constant value. The closing of the relay 44, as well as the closing of the other rate of change devices employed in the systems of the invention, will be independent of the instantaneous value of the energizing current of the relay. In order to close the contactor 42, it is necessary to move the master switch 50 to the left to its fourth operative position. The operation as above described has been based on the assumption that the operator desires to arrest the step-by-step acceleration of the motor at the definite speed control points. In case the operator desires that the motor shall accelerate automatically to the full operating speed in the forward direction, he will throw the master switch 50 directly to the fourth or final operative position. The arrangement will function as before, with the exception that as soon as the relay 51 closes, the contactor 40 will be energized to close, and the closing of the relay 43 will energize the contactor 41 to close, and the closing of the relay 44 will energize the contactor 42 to close. If at any time the operator desires that the speed of the motor shall be reduced, he may return his controller from the fourth operative position to the third, thereby deenergizing the contactor 42 and inserting the resistor 37 in the motor circuit. Likewise the resistor 38 may also be inserted in the motor circuit by moving the controller to the second operative position, and moving the controller to the first operative position will also insert the resistor 39 in the motor circuit.

In case the motor is operating in the forward direction and it is desired to reverse the motor, the master switch may be thrown directly from a forward running position to any one of the reverse positions. The forward line contactors 32 and 33 will thereupon be opened and the reverse line contactors 34 and 35 will be energized to close. The closing of the contactor 35 will short circuit the winding 51$^a$ of the relay 51, and because of the fact that the winding 51$^b$ of this relay is connected across the motor armature, the switch member of this relay will be magnetically operated to the open position and magnetically held in this position. The resistor contactors 40, 41 and 42 will all be deenergized and opened, thereby inserting the resistors 37, 38 and 39 in the motor circuit. The winding 52$^a$ of the relay 52 which had been short circuited by the line contactor 33 in the forward motor operation is now energized across the supply circuit to close this relay at the proper interval. However, the magnetic flux set up by the winding 52$^a$ combines with the magnetic flux set up by the winding 52$^b$ through the lower leg of the relay so that the relay will be held open for an interval. The generated potential of the motor will gradually fall as the speed of the motor decreases, and the flux set up by the winding 52$^b$ will gradually disappear. The relay 52 will close its contacts due to the magnetic pull set up by the winding 52$^a$ across the upper air gap thereby energizing the contactor 40 to short circuit the plugging resistor 39. The relays 43 and 44 will now function to control the closing of the contactors 41 and 42 respectively in the manner previously described for the forward operation.

In the arrangement previously shown, the switch mechanism operated in accordance with the rate of change of a motor operating condition took the form of relays controlling motor accelerating switches. The invention is not limited to such an arrangement, since the switch mechanism operated in accordance with the rate of change of a motor operating condition may directly control the motor circuit so as to control the acceleration of the motor. Such an arrangement is shown in very simplified diagram in a non-reversing motor control in Fig. 4. Referring to this figure, the contactor 57 is provided for short circuiting the resistor 58, the contactor 59 is provided for short circuiting the resistor 60, and the contactor 61 is provided for short circuiting the resistor 62. The line contactor 63 is provided for connecting the motor to a supply circuit. The contactors 57, 59 and 61 may be of the form shown in Fig. 1, with the switch contact mechanism suitably designed for carrying a substantial current rather than merely a control circuit current.

It is believed that with the explanations of my invention heretofore given, the operation of the arrangement shown in Fig. 4 will be readily understood from a brief description. Closing the pilot switch 64 will energize the line contactor 63 and connect the motor to the source of supply, and at the same time connect the winding of the contactor 57 across the motor armature through the auxiliary switch 65 associated with the line contactor 63. The counter electromotive force of the motor will gradually rise from a zero value to a substantially constant value which is dependent upon the speed of the motor. The contactor 57 will be magnetically held open while the current in the magnet winding is changing, because of the fact that the holding-open force will predominate over the closing force. When the counter-electromotive force of the motor becomes substantially constant, or the rate of change thereof diminishes to a predetermined value, the closing force of the switch will predominate over the holding-open force and the switch will close, independently of the instantaneous value of the counter electromotive force, thereby short circuiting the resistor 58 and at the same time connecting the winding of the contactor 59 across the motor armature. This contactor 59 will be controlled in a similar manner to the contactor 57 so as to retard the closing thereof in response to the rate of change of the counter-electromotive force of the motor. The closing of this contactor will not only short circuit the resistor 60 but also connect the winding of the contactor 61 across the motor armature, so that the resistor 62 will also be short circuited in response to the rate of change of the counter-electromotive force of the motor. The arrangement of Fig. 4 is shown as a non-reversing control in which the automatic progression of the step by step acceleration of the motor proceeds automatically after the closing of the pilot switch 64. From the principles of my invention fully explained in connection with the previous figures, those skilled in the art will readily adapt the arrangement of Fig. 4 to a reversing control and to an arrangement in which a multi-position master switch controls the step by step progression of the accelerating switches in a manner generally set forth in connection with Fig. 3.

In the arrangement of Fig. 5 I have illustrated a non-reversing equipment in which the automatic step by step progression of the closing of the resistor contacts is effected without the use of auxiliary switches or "interlocks" connected to be operated by the resistor contactors. In this arrangement, when the pilot switch 66 is closed, the line contactor 67 is energized to close and thereby connect the motor to the source of supply through the resistors 68, 69 and 70. The winding of the relay 71 is connected across the motor armature so as to be energized in accordance with the counter-electromotive force of the motor. This relay is provided for controlling the resistor contactor 72. The relay 73 is provided for controlling the resistor contactor 74, and the relay 75 is provided for controlling the resistor contactor 76. The winding $73^a$ of the relay 73 and the winding $75^a$ of the relay 75 are energized in multiple with the winding of the relay 71 across the motor armature and therefore the windings are responsive to the counter-electromotive force of the motor. The winding $73^b$ of the relay 73 is connected across the resistor 68 and the winding $75^b$ of the relay 75 is connected across the resistors 68 and 69. The relays 73 and 75 will be magnetically maintained in their open positions by their windings $73^b$ and $75^b$, respectively, until the proper interval in the starting of the motor. The magnetic closing force of the relay 71 will predominate over the magnetic holding-open force under the control of the rate of change of the counter-electromotive force of the motor and the relay will close, thereby energizing the contactor 72 to short circuit the resistor 68. When the resistor 68 is short circuited, the winding $73^b$ of the relay 73 is also short circuited so as to give the control of the closing of the relay 73 to the winding of the relay $73^a$. When the counter-electromotive force of the motor becomes a substantially constant value, or the rate of change of the counter-electromotive force diminishes to a predetermined value, the magnetic closing force of the relay 73 will predominate over the magnetic holding-open force and this relay will close, thereby energizing the contactor 74 to close and thus short circuit the resistor 69. The contactor 74 also short circuits the winding $75^b$ of the relay 75, so that the control of the closing of this relay is given to the winding $75^a$. When the counter electromotive force of the motor becomes a substantially constant value, the magnetic closing force of the relay 75 will predominate over the magnetic holding-open force and this relay will close, thereby energizing the resistor contactor 76 to close. From the principles of the invention heretofore given, those skilled in the art will readily adapt the arrangement of Figure 5 to a reversing equipment in which the step-by-step progression of the resistor contactors is under the control of the operator.

The arrangement of the invention as shown in Fig. 5 may also be used in a system of control in which the rate-of-change switch mechanism takes the form of contactors which themselves control starting resistors. Such an arrangement is shown in Fig. 6. It is believed that from the foregoing description of the various principles of the invention and the various modifications, this form of the invention will be readily understood by those skilled in the art by a brief description of the operation of the arrangement.

Closing the master switch 77 will connect the motor to the source of supply through the resistors 68, 69 and 70. The winding of the resistor contactor 78 will be connected across the motor armature, and the winding $79^a$ of the contactor 79 and $80^a$ of the contactor 80 will all be connected in multiple across the motor armature by the closing of the auxiliary switch 81 associated with the line contactor 82. The winding $79^b$ of the contactor 79 will be connected across the resistor 68 and the winding $80^b$ of the contactor 80 will be connected across the resistors 68 and 69. The contactor 78 will close in response to the rate of change of the counter-electromotive force of the motor thereby short circuiting the resistor 68 and the winding $79^b$ of the contactor 79. The control of the closing of the contactor 79 is thus given to the winding $79^a$, and this contactor will also close under the control of the counter-electromotive force of the motor. The contactor 79 will short circuit the resistor 69 and also the winding $80^b$ of the contactor 80, so that the control of the closing of the contactor 80 is given to the winding $80^a$. This contactor will in turn close under the control of the counter-electromotive force of the motor, thereby short circuiting the resistor 70. While I have shown my invention as applied to systems of motor control in which control of the motor is in accordance with the rate of change of the counter-electromotive force of the motor, I would have it understood that the counter-electromotive force of the motor is only one of several changing conditions which may be used as the controlling condition for governing the acceleration of the controlled motor.

In accordance with the provisions of the patent statutes, I have described the principles of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. A system of motor control comprising a motor circuit, means for controlling the motor speed, a controlling device for the said means comprising a switch member movable from one position to another position, and an electromagnet having a magnetic circuit and a winding therefor connected with the motor circuit to be energized in accordance with a varying condition of the motor circuit, and means for controlling the magnetic forces set up in said structure by said winding to cause the said switch member to be magnetically held from operating to a second position when the rate of change of the said condition of the motor circuit is relatively high and to cause the switch member to be magnetically operated to the second position independently of the instantaneous value of the energizing current when the rate of change of the energizing current diminishes to a predetermined value.

2. A system of motor control comprising a motor circuit, means for controlling the motor speed, a controlling device for the said means comprising a switch member biased to one position, an electromagnet having a winding connected with the motor circuit to be energized in accordance with the counter-electromotive force of the motor to be controlled and a magnetic structure energized by the said winding, and means for controlling the magnetic forces set up in the said structure by said winding to cause the said magnetic forces to reinforce the bias of the switch member and prevent the same from operating to a second position when the rate of change of the motor counter-electromotive force is relatively high and to cause the said magnetic forces to overcome the bias and cause the switch member to operate to the second position substantially independently of the instantaneous value of the motor counter-electromotive force when the rate of change of the motor counter-electromotive force diminishes to a predetermined value.

3. A system of motor control comprising a motor circuit, means for controlling the motor speed, a controlling device for the said means comprising a switch member biased to the open position, an electromagnet having a shunt winding connected across points in the motor circuit to be energized in accordance with a varying condition of the motor circuit for setting up two magnetic forces with respect to the said switch member, one an actuating force tending to move the switch member to the closed position, and the other an opposing force tending to prevent the same, and means for causing the opposing force set up by said winding to predominate when the rate of change of the condition of the motor circuit is comparatively high and the actuating force set up by said winding to predominate to move the switch member to the closed position substantially independently of the instantaneous value of the energizing current of said winding when the rate of change of the condition of the motor circuit diminishes to a predetermined value.

4. A system of motor control comprising a motor circuit, means for controlling the motor speed, a switch member biased to one position for controlling the said means, electromagnetic means having a winding connected with the motor circuit to be energized in accordance with the changes of an electrical condition of the motor circuit to provide two magnetic forces, the first of said forces for holding the switch member in the biased position and the second of said forces for moving the switch member to a second position, and means for varying the said second magnetic force set up by said winding in accordance with the rate of change of the said condition of the motor circuit to cause the said first force set up by said winding to predominate while the said condition of the motor circuit is changing and to cause the said second force to predominate substantially independently of the instantaneous value of the energizing current of said winding when the said condition becomes substantially constant.

5. A system of motor control comprising a motor circuit, means for controlling the motor speed, a switch member biased to one position for controlling the said means, an electromagnet having a winding connected to be energized in accordance with the changes of an electrical condition of the motor circuit, a magnetic circuit energized by the said winding to provide two magnetic forces, the first force predominating over the second force to move the switch member to another position when the current in the said winding is a substantially constant value, and a short circuited non-magnetic conductor of low electrical resistance surrounding a portion of the said magnetic circuit for retarding the increase of the first force while the rate of increase of the exciting current of the said winding is relatively high so that the second force predominates over the first force to hold the switch member in the biased position until the exciting current of the magnet winding is a substantially constant value.

6. A system of motor control comprising a motor circuit, a speed regulating resistor connected in the motor circuit, an electromagnetic switch for controlling the said resistor, the said switch having a winding connected in multiple relation with the motor armature to be energized in accordance with the changes of the counter electromotive force of the motor, a switch member biased to one position under the control of said winding, and a magnetic structure for the switch arranged when energized by the said winding to have set up therein by said winding two magnetic forces which vary with respect to each other as the rate of change of the counter electromotive force of the motor varies, one of said forces tending to hold the switch member in its biased position and the other force acting in opposition thereto to magnetically operate the switch member to a second position substantially independently of the instantaneous value of the motor counter-electromotive force when the counter electromotive force of the motor becomes substantially constant.

7. A system of motor control comprising a motor circuit, a speed regulating resistor connected in the motor circuit, an electromagnetic switch for controlling the said resistor, the said switch having a shunt winding connected across points in the motor circuit between which there is a difference of potential which changes responsively to the changes of a motor operating condition, a switch member biased to the open position under the control of said winding, and a magnetic structure for the switch arranged when energized by the said winding to have set up therein by said winding two magnetic forces which vary with respect to each other as the rate of change of the said motor operating condition, one of said forces tending to hold the switch member in its biased position and the other force acting in opposition thereto to magnetically operate the switch member to a closed position when the potential difference between the said points in the motor circuit becomes a substantially constant value substantially independently of the instantaneous value of said potential difference.

8. In combination in a system of motor control, an electric motor, a circuit therefor, current limiting means in said circuit, an electromagnetic switch for controlling said means, the said switch having a movable switch member mounted to be in mechanical balance, means for biasing said member to the open position, and an electromagnet for magnetically releasing the biasing effect of said means and for magnetically holding the said member in the open position and magnetically operating said member to the closed position thereof, the said electromagnet having a shunt winding connected across points in the motor circuit to be energized in response to a changing condition of the circuit during speed variation of said motor, a magnetic structure energized by said winding and providing a plurality of definite paths for the flux set up by the said winding, the flux in one of said paths setting up a magnetic holding open force on said member and the flux in the other of said paths setting up a magnetic closing force on said member, and means associated with said structure to control the distribution of the said flux in said paths in response to the rate of change of the current in said winding to cause said holding open force to predominate substantially independently of the instantaneous value of the ampere turns of said winding when said rate is relatively high and to cause said closing force to predominate substantially independently of the instantaneous value of the ampere turns of said winding when said rate is reduced.

In witness whereof, I have hereunto set my hand this 28th day of May, 1924.

BENJAMIN W. JONES.